(12) United States Patent
Ketteler

(10) Patent No.: US 7,053,504 B2
(45) Date of Patent: May 30, 2006

(54) SWITCHING SYSTEM TO MAKE ENERGY AVAILABLE TO ELECTRIC CONSUMERS OF DIFFERENT ENERGY REQUIREMENT

(75) Inventor: Karl-Hermann Ketteler, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 72 days.

(21) Appl. No.: 10/731,057

(22) Filed: Dec. 9, 2003

(65) Prior Publication Data

US 2004/0119337 A1   Jun. 24, 2004

(30) Foreign Application Priority Data

Dec. 20, 2002   (DE) ................................ 102 59 879

(51) Int. Cl.
*H02J 1/00* (2006.01)

(52) U.S. Cl. ........................... 307/72; 307/45; 307/66; 323/222; 363/41; 363/98

(58) Field of Classification Search ................ 323/222, 323/271, 272; 307/10.7, 66, 45, 46, 72; 363/35, 363/37, 34, 51, 56, 97; 318/139, 801
See application file for complete search history.

(56) References Cited

U.S. PATENT DOCUMENTS

| | | | |
|---|---|---|---|
| 4,719,550 A * | 1/1988 | Powell et al. | 363/37 |
| 4,727,448 A * | 2/1988 | Hanyuda et al. | 361/18 |
| 5,373,195 A * | 12/1994 | De Doncker et al. | 307/45 |
| 5,635,771 A | 6/1997 | Mertl et al. | 307/10.7 |
| 6,202,615 B1 | 3/2001 | Pels et al. | 123/179.3 |
| 6,369,461 B1 * | 4/2002 | Jungreis et al. | 307/46 |
| 6,384,579 B1 | 5/2002 | Watanabe | 320/168 |
| 6,426,608 B1 * | 7/2002 | Amano et al. | 320/163 |

FOREIGN PATENT DOCUMENTS

| | | |
|---|---|---|
| DE | 44 22 231 A1 | 1/1996 |
| DE | 198 09 399 A1 | 2/1999 |
| DE | 198 59 036 A1 | 6/2000 |
| DE | 199 03 427 A1 | 8/2000 |
| EP | 1 244 191 A2 | 9/2002 |

\* cited by examiner

*Primary Examiner*—Rajnikant B. Patel
(74) *Attorney, Agent, or Firm*—Davis & Bujold, P.L.L.C.

(57) ABSTRACT

A switching system, preferably for use in the power supply of motor vehicles, and having one chargeable energy memory of a specific voltage level and consumers situated in the circuit of the energy memory is further developed so that a significant power load is thoroughly prevented even in the case of a high momentary power requirement of the electric consumers. The energy memory is designed for this purpose as power-limiting primary memory (1) to ensure the operation of a first group of consumers (2). The switching system further has a secondary energy memory (4) chargeable proceeding from the primary energy memory (1) which makes energy available to a second group of consumers (5) so that during energy delivery from the secondary energy memory (4) to the consumers (5) of the second group a feedback to the primary energy memory (1) is thoroughly prevented even during loading of the same by consumers (2) of the first group.

20 Claims, 2 Drawing Sheets

SWITCHING SYSTEM TO MAKE ENERGY AVAILABLE TO ELECTRIC CONSUMERS OF DIFFERENT ENERGY REQUIREMENT

This application claims priority from German Application Ser. No. 102 59 879.7 filed Dec. 20, 2002.

FEILD OF THE INVENTION

The invention relates to a switching system to make energy available to electric consumers of different energy requirement, preferably to be used in the power supply of a motor.

BACKGROUND OF THE INVENTION

The energy for a power supply of a motor vehicle is, in general, made available by a generator driven by the internal combustion engine of the motor vehicle and by a power supply battery which is loaded by the generator and makes energy available to a plurality of electric consumers in the vehicle for ensuring the operation safety thereof. With the progressive development of the vehicle technology, in particular, the number and energy requirement of electric and electronic components of the vehicle also considerably increases. Electric consumers play a continuously increasing part having a power need that is comparatively high, but that occasionally persists only for a relatively short time interval.

DE 198 59 036 A1 has disclosed a power supply for a motor vehicle having only one primary system consisting of one generator, one power-supply battery and at least one consumer and one secondary system having one DC/DC converter and one capacitor which is loaded or unloaded according to the operating state of the motor vehicle.

With such a solution, support of the primary system of the power supply is achieved in the sense that in case of unfavorable operating conditions the energy stored in the capacitor can be made available again to the consumers situated in the primary system of the power supply. The energy of the primary system is supplied unspecifically with regard to those consumers having different power requirement.

The problem on which the invention is based is to further develop a switching system for making energy available to electric consumers in a manner such that even in case of high momentary power requirement of electric consumers a significant power load to a great extent does not occur.

SUMMARY OF THE INVENTION

In a switching system to make energy available to electric consumers, the solution of the problem consists in that the energy memory is designed as power-limited primary energy memory for ensuring the operation of a first group of consumers and that the switching system has as secondary energy memory at a higher voltage level relative to the primary energy memory and, which proceeding from the primary energy memory, can be charged and make energy available to a second group of consumers so that during energy delivery from the secondary memory to the consumers of the second group, a feedback to the primary energy memory substantially does not occur even while being loaded by consumers of the first group.

The invention is associated with the advantage that on the basis of the operational and switch technology separation of the first group of consumers from the second group of consumers, a memory medium for electric energy can be associated with the second group of consumers so that said memory medium makes electric energy available to the second group of consumers without causing a noticeable feedback to the energy memory associated with the first group of consumers whereby a permanently stable supply of energy can be ensured to the latter.

In a convenient development of the invention, the secondary memory is charged from the primary memory by a voltage converter designed as high set adjuster which is preferably used up to a voltage level of about 50 V. A high set adjuster is basically in position to steadily supply a voltage level of about 3 to 4 times the value of the power supply voltage. For reasons of personal safety, voltages clearly above 50 V are eliminated in the vehicle.

To make a voltage range available far exceeding the 50 V level, it is possible for charging the secondary memory from the primary memory to use a voltage converter based on transformatory potential insulation whose maximum voltage fundamentally is not limited, since insulation errors are easily detected without personal danger and can optionally be removed after disconnecting the constructional unit concerned.

To obtain a fitter design of the invention, a thorough uncoupling of the primary memory from the secondary memory, said secondary memory is designed as memory capacitor with large voltage swing. As memory capacitors can be used double-layer and multi-layer capacitors of high capacity whose voltage level is adapted to the consumers of the second group.

In continuation of the invention, it is possible to provide a current-limiting unit in which as parameter the total current load capacity of the primary memory and the current load of the primary memory are detected by the consumers of the fist group and depending on this a defined current flow is determined and released for charging the secondary memory. Such a development of the invention is based on the consideration that the primary energy memory, which makes the energy available to the consumers of the first group, can be apportioned so that in the average time energy can be removed from it in the limited bulk for charging the secondary memory without limiting or imperiling the operating capacity of the consumers of the first group.

Upon the primary memory, if there is admitted an effect of the secondary memory which is associated with a certain drop of voltage in the primary memory, the switching system can conveniently to detect the voltage of the primary memory, one monitoring device which interacts with a current-limiting unit for limiting the current made available by the secondary memory to the consumers of the second group.

There further exists the basic possibility, via a corresponding unit and depending on the actual voltage of the primary memory, of limiting the current flow which is made available from the primary memory for charging the secondary memory.

In a preferred development of the invention, the consumers of the first group are reduced-power consumers and the consumers of the second group high-powered consumers compared to the power consumption of the reduced-power consumers. The apportioned voltage of said consumers is determined by the voltage range of the memory capacitor to be utilized so that by an adequate selection of the memory capacitor, it is possible to use high-powered consumers of a comparatively low load current due to the high voltage.

In further development of the invention, an electronic control unit for power control of the consumers of the second group is a component part of the switching system.

In the control unit, from a variable input voltage, a constant output voltage at lower level is produced so that the voltage fluctuations of the secondary energy memory conditioned by principle are not noticeable for the consumers of the second group.

For protection of an interference-free operation of the high-powered consumers, the voltage converter preferably is not deactivated even after reaching the maximum load voltage of the secondary memory. If the voltage converter is designed as high-setting adjuster, the inductivity of the supply cable can purposefully be used as throttle.

The switching system described is suited to the most varied applications in which electric consumers of different power requirement are fed by an energy memory, part of the available energy being made available to one other energy memory for thorough feedback-free supply of consumers of preselected range of power requirement.

Such a switching system can conveniently be used in 12-V and 42-V power supplies of motor vehicles where preferably a voltage converter fed from the power supply battery and designed as high-setting adjuster loads an energy memory which makes energy available for high-powered consumers.

BRIEF DESCRIPTION OF THE DRAWINGS

The invention will now be described, by way of example, with reference to the accompanying drawings in which.

DETAILED DESCRIPTION OF THE INVENTION

Figure 1:
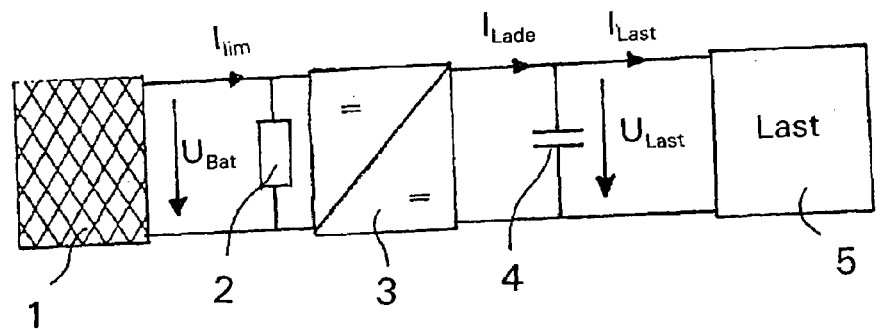
FIG. 1 is a block wiring diagram of an inventive switching system.

The block wiring diagram of a power supply of a motor vehicle, shown in FIG. 1, shows a power-supply battery 1 acting as primary memory, the energy of which is made available to a group of reduced-power consumers 2 and to a voltage converter designed as high-setting adjuster 3. The group of reduced-power consumers 2 is simplifyingly understood in the graph as total resistance. The energy is made available to the high-powered consumers 5.

Figure 2:
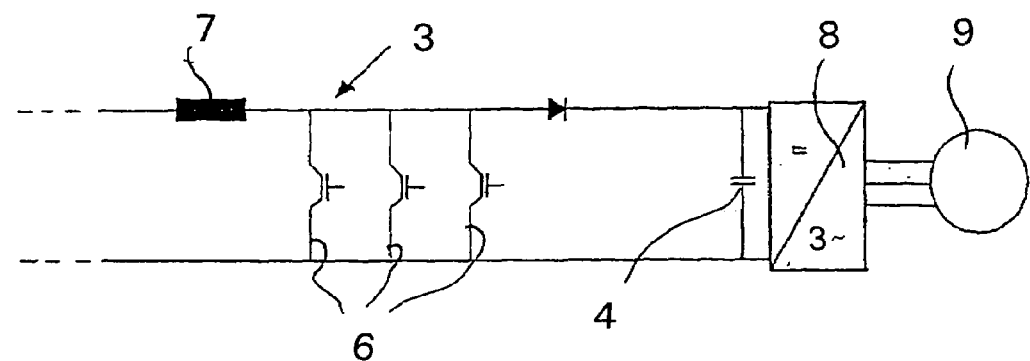
FIG. 2 is a fundamental switching system with a high-setting adjuster as voltage converter.

The high-setting adjuster 3 acting as loading pump essentially consists, as shown in FIG. 2, of the MOSFET switch steps 6 which by means of offset cycles, produce a frequency above 3×20 kHz and of a high-setting adjuster inductivity which in this embodiment of the invention is made available as cable inductivity 7 to the feedlines to the high-setting adjuster 3. Based on the desired operating characteristics of the high-setting adjuster 3, the required cable inductivity 7 can be selected by a variation of the circuit parameters and of the wiring.

By a multi-layer capacitor 4 acting as secondary memory and can be at a voltage level of about 50 V, the energy stored is relayed with stabilized voltage via a rectifier 8 to a motor 9 which is to be graded as high-powered consumer 5, since it can be, for example, a component part of an actuator for stabilizing the motion of the motor vehicle. Actuators with this or similar functionality preferably can be used on the basis of the inventive manner of making energy available since a high power must be callable only for short time intervals for such drive mechanisms.

Figure 3:
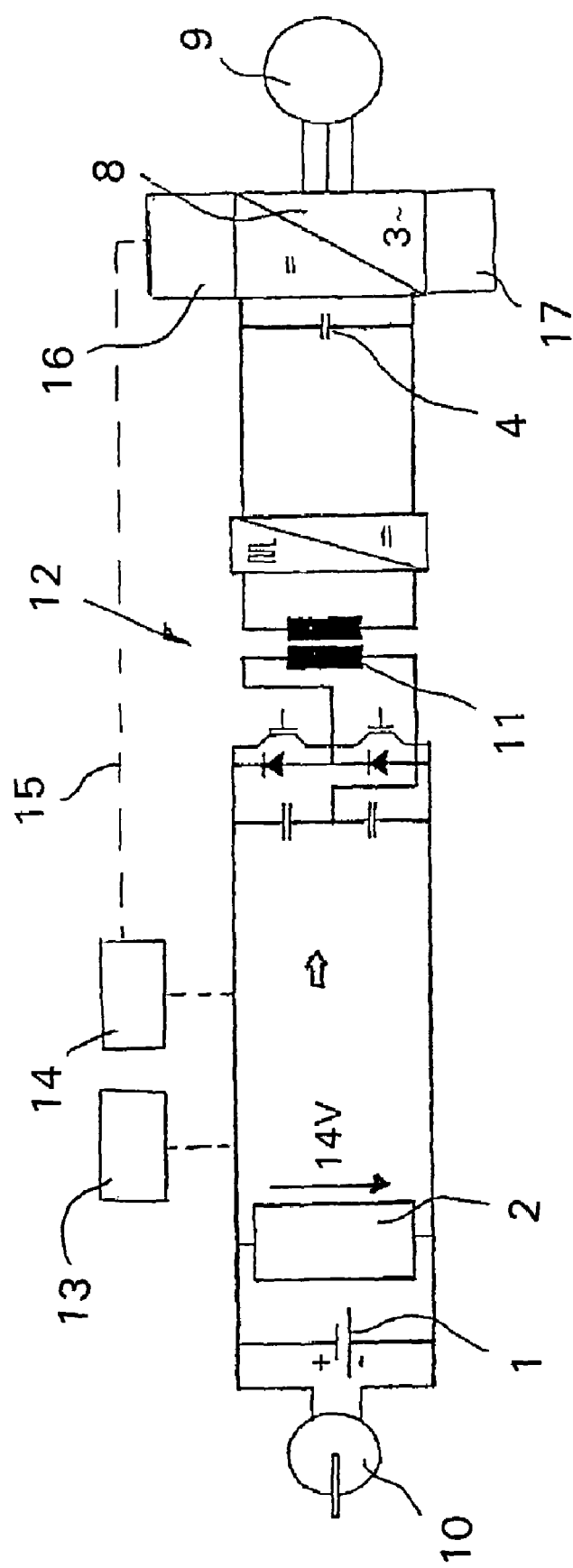
FIG. 3 is a switching system according to FIG. 2 with a quasi-resonant voltage converter.

A further possibility in development of the invention is to be understood from the graph in FIG. 3. A generator 10, driven by the motor of the motor vehicle, is connected with the power-supply battery 1 and reduced-power consumers 2. The generator 10, the power-supply battery 1 and the reduced-power consumers 2 are purposefully selected so as to obtain an additional power capacity of the power supply which is used for charging the multi-layer capacitor 4. The voltage level of the multi-layer capacitor 4 obtain results from the type of voltage converter which, unlike the high-setting adjuster 3 used in FIG. 2, is based on the principle of the quasi-resonant transformation implemented in the graph of FIG. 3. Since quasi-resonant transformers are sufficiently known per se to those skilled in the art, it is not necessary at this point to go into them further.

A transformer 11 of a quasi-resonant voltage transformer 12, used in the design of the switching system according to FIG. 3, for example, has a reduction ratio of 1:20 so that the multi-layer capacitor 4 undergoes a regular voltage swing of 90 V to 279 V. Similarly to the design of the invention according to FIG. 2, the energy stored in the multi-layer capacitor 4 is delivered via the rectifier 8 to the motor 9. The comparatively high voltage abutting on the multi-layer capacitor 4, makes it possible to work with relatively low current which simplifies the joining of the high-powered consumers 5 in the switching system.

As a component part of the switching variant according to FIG. 3, a current limiting unit 13 is further provided which determines a maximum admissible current flow for charging the multi-layer capacitor 4 whereby a too strong loading of the power-supply battery 1 can be prevented which can shorten its durability. This wiring complementarily has a monitor device 14 serving to detect the voltage of the power-supply battery 1 and is connected via a control line 15 with a current-limiting unit 16 for the high-powered consumer 5 so that purposeful influence can be received on the consumer characteristics of the high-powered consumers 5. For power control of the high-powered consumers 5, an electronic control unit 17 is provided in which a constant output voltage of low level is produced from a variable input voltage.

Switching systems of the design described makes integrating high-powered consumers 5 in this power supply possible, on the basis of the purposefully provided additional power capacity of the power supply combined with a high-setting adjuster 3 and a multi-layer capacitor 4 acting as energy memory.

| Reference numerals | |
|---|---|
| 1 | power-supply battery |
| 2 | reduced-power consumers |
| 3 | high-setting adjuster |
| 4 | multi-layer capacitor |
| 5 | high-powered consumers |
| 6 | MOSFET switch steps |
| 7 | cable inductivity |
| 8 | rectifier |
| 9 | motor |
| 10 | generator |
| 11 | transformer |
| 12 | quasi-resonant voltage converter |
| 13 | current-limiting unit |
| 14 | monitoring device |
| 15 | control line |
| 16 | current-limiting unit |
| 17 | control unit |

The invention claimed is:

1. A power supply system for use in a motor vehicle for providing electrical energy to first and second electric consumers, the power supply system comprising:
   a primary energy storage for providing electrical energy at a first voltage level to the first energy consumer;
   a secondary energy storage for providing electrical energy at a second voltage level to the second energy consumer; and
   a voltage converter connected from the primary energy storage to the secondary energy storage for receiving electrical energy from the primary energy storage and providing electrical energy to the secondary energy storage,
      wherein the second voltage level is higher than the first voltage level; and
      the electrical energy provided to the secondary energy storage is stored in the secondary energy storage to be provided to the second energy consumer for a period of time when required, whereby
         the second voltage level will not fall below the first voltage level during the period of time, thereby preventing a feedback from the secondary energy storage to the first energy storage.

2. The power supply system according to claim 1, wherein the voltage converter (3) is a high-setting adjuster.

3. The power supply system according to claim 1, wherein the voltage converter (12) is based on transformatory potential separation.

4. The power supply system according to claim 1, wherein the secondary energy storage is a storage capacitor (4) of great voltage swing.

5. The power supply system according to claim 4, wherein said secondary energy storage is designed as one of a double-layer or multi-layer capacitor (4) of high capacity.

6. The power supply system according to claim 1, wherein a current-limiting unit (13) is provided by which the first consumer is detected as a parameter of a total current load capacity of said primary energy storage (1) and the current load of said primary energy storage (1) and depending thereon, a defined current flow from charging said secondary energy storage (4) is determined and released.

7. The power supply system according to claim 1, wherein the switching has a monitoring device (14) for detecting the voltage of said primary energy storage (1) which interacts with a current-limiting unit (16) for limiting the current made available by said secondary energy storage (4) to said second consumer.

8. The power supply system according to claim 1, wherein the first consumer is a reduced-power consumer (2) and the second consumer is a high-powered consumer (5) relative to the power consumption of the first consumer.

9. The power supply system according to claim 1, wherein for power control of second consumer, an electronic control unit (17) is provided which produces a constant output voltage of low level from a variable input voltage.

10. The power supply system according to claim 2, wherein the voltage converter (3) a cable inductivity (7) as a throttle.

11. The power supply system according to claim 2, wherein the voltage converter (3, 12) is not deactivated even after a maximum loading voltage has been reached.

12. The power supply system according to claim 1, wherein is used in at least one of a 12-V and a 42-V power supply of the motor vehicle.

13. A power supply system for use in a motor vehicle for providing electrical energy to first and second electric consumers, the power supply system comprising:
   a primary energy storage for providing electrical energy at a first voltage level to the first energy consumer;
   a secondary energy storage receiving electrical energy solely from the primary energy storage for providing electrical energy at a second voltage level to the second energy consumer, and
   a voltage converter connected from the primary energy storage and to the secondary energy storage for receiving electrical energy from the primary energy storage and providing electrical energy to the secondary energy storage,
      wherein the second voltage level is higher than the first voltage level; and
      the electrical energy provided to the secondary energy storage is stored in the secondary energy storage to be provided to the second energy consumer for a period of time when required, whereby
         the second voltage level will not fall below the first voltage level during the period of time, thereby preventing a feedback from the secondary energy storage to the first energy storage.

14. The power supply system according to claim 13, wherein the voltage converter (3) is a high-setting adjuster.

15. The power supply system according to claim 13, wherein the voltage converter (12) is based on transformatory potential separation.

16. The power supply system according to claim 13, wherein the secondary energy storage is a storage capacitor (4) of great voltage swing.

17. The power supply system according to claim 16, wherein said secondary enemy storage is designed as one of a double-layer or multi-layer capacitor (4) of high capacity.

18. The power supply system according to claim 13, wherein a current-limiting unit (13) is provided by which the first consumer is detected as a parameter of a total current load capacity of said primary energy storage (1) and the current load of said primary energy storage (1) and depending thereon, a defined current flow from charging said secondary energy storage (4) is determined and released.

19. The power supply system according to claim 13, wherein the switching has a monitoring device (14) for detecting the voltage of said primary energy storage (1) which interacts with a current-limiting unit (16) for limiting the current made available by said secondary energy storage (4) to said second consumer.

20. The power supply system according to claim 13, wherein the first consumer is a reduced-power consumer (2) and the second consumer is a high-powered consumer (5) relative to the power consumption of the first consumer.

* * * * *